United States Patent Office 3,637,662
Patented Jan. 25, 1972

3,637,662
1-[2-(PHENYL)-LOWER-ALKYL]-AZIRIDINES
Raj K. Razdan, Belmont, Mass., assignor to the United States of America as represented by the Secretary of the Army
No Drawing. Continuation-in-part of abandoned application Ser. No. 640,815, May 24, 1967. This application Mar. 25, 1970, Ser. No. 22,668
Int. Cl. C07d 45/00, 99/04
U.S. Cl. 260—239 E
4 Claims

ABSTRACT OF THE DISCLOSURE

1-[2-(3,4,5-trimethoxyphenyl)ethyl]aziridine, 1-[1-(3,4,5-trimethoxyphenyl)-2-propyl]aziridine and 1-[1(2-methoxy-4,5-methylenedioxyphenyl)-2-propyl]-aziridine are prepared from the appropriate vinyl-substituted benzene and ethylenimine. The compounds are useful as mild incapacitating agents.

DEDICATORY CLAUSE

The invention described herein may be manufactured, used, and licensed by or for the Government for governmental purposes without the payment to me of any royalty thereon.

This application is a continuation-in-part of U.S. patent application Ser. No. 640,815, filed May 24, 1967, and now abandoned, and relates to novel aziridines. More particularly, the invention here is to certain 2-(tri-substituted phenyl)ethylaziridines.

The aziridines of the invention, have in the free base form the structural formulas

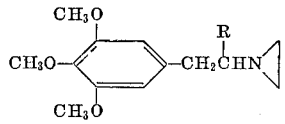

and

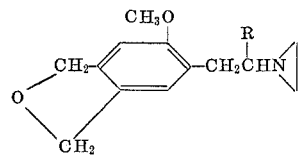

wherein R is hydrogen or methyl.

One of the significant anatomical differences between the neuromuscular junctions and other acetylcholine receptive sites is the absence of a membrane barrier or a sheath such as envelops the ganglia. Accessibility of the aforementioned neuromuscular junctions and other acetylcholine receptive sites to the compounds of this invention evoke physiological actions that modify or interrupt normal neuromuscular impulse transmission. Depending on their chemical structures, different compounds interfere with the mechanism of impulse transmission in animals in different manners and the final physiological effects can vary considerably which accounts for the utilization of some prior art compounds as therapeutic agents and other prior art compounds as lethal or incapacitating agents. The nature of the functional groups of the compounds, the length and branching of alphatic chains, and the number and configuration of aromatic and alicyclic rings affect the ease or difficulty of approach of the compound to the specific neuromuscular junctions and other acetylcholine receptive sites. Substitution of different functional groups influence association and hydration and can considerably change the solubilities in animal physiological media, either in vivo or in vitro.

As demonstrated by the test data set forth in Table I, the compounds of this invention are mildly toxic, and due to the toxicity, the compounds of this invention interfere with the normal process of neuromuscular impulse transmission and disrupt the propagation of impulses from animal nerves to muscles and mildly incapacitate the animal. Accordingly, the compounds of my invention were conceived and reduced to practice to supply a long sought composition which, due to adnormal physiological behavior produced in animals as a result of the effect on the central nervous system caused by the toxicity of the compound, can be used as an agent to induce mild incapacitation in an animal. The abnormal physiological behavior can result from mere contact of the compounds of this invention with the skin of the animal, and such contact can be brought about by means of dissemination of the compound by any conventional chemical munition having the compounds of this invention as a payload such as bombs, shells, spray tanks, rockets, missiles, aerosol generators, etc.

The principal object of this invention is to synthetize a new composition of matter useful to induce incapacitation in an animal.

Other objects of and uses for my invention will be obvious from and will appear hereinafter in the following detailed description of the invention.

TABLE I

| Compound tested | Screen animal | Dose/animal weight in mg./kg. | Symptoms |
|---|---|---|---|
| Example 1 end product herein. | Mouse | $LD_{50}$*, 100.0, $MED_{50}$**, 56.0; Ratio $LD_{50}$/-$MED_{50}$, 1.8. | General activity decreased by mild hyperexcitation, mild motor deficit of short duration salivation, exophthalmos. |
| Example II end product herein. | do | $LD_{50}$, 100.0, $MED_{50}$, 32.0; Ratio $LD_{50}$/-$MED_{50}$, 3.1. | General activity decreased and mild motor deficit. |

*$LD_{50}$—Dosage necessary to kill.
**$MED_{50}$—Dosage necessary to incapacitate.

The preparation of the new 2-(trisubstituted-phenyl)-ethylaziridines is carried out by treating the appropriately substituted vinylbenzene with ethylenimine in the presence of sodium metal. Conveniently the substituted phenyl alkene is interacted with an excess of ethylenimine as a solvent to produce the aziridines. The free base can be isolated as such or converted to any desired acid addition salt by treatment with one equivalent of the appropriate organic or inorganic acid. The acid addition salts of the base are the form in which the base is most conveniently prepared for use and are the full equivalents of the subject matter specifically claimed.

The intermediate vinylbenzenes are a known class of compounds generally prepared by dehydration of the appropriate alcohol.

The structures of the compounds of the invention are established by the mode of synthesis by nuclear magnetic resonances and infrared spectroscopy, and agreement of the found values with the calculated values in elementary analysis.

The 2-(trisubstituted-phenyl)ethylaziridines are prepared for use in the manner by which psychotropic agents are conventionally formulated.

The invention is illustrated by the following examples without, however, being limited thereto.

EXAMPLE 1

1-[2-(3,4,5-trimethoxyphenyl)ethyl]aziridine

To 0.15 g. of sodium metal in 4.3 g. of ethylenimine was added over ten minutes with stirring 8.5 g. of 3,4,5-trimethoxystyrene. The solution colored and an exothermic reaction took place. After the reaction had subsided the mixture was stirred at room temperature for twenty-two hours. The solution was decanted from the excess sodium metal and diluted with 75 ml. of ether. The ether layer was washed with water, dried and the ether removed by evaporation. Fractional distillation gave 1.72 g. of 1-[2-(3,4,5-trimethoxyphenyl)-ethyl]aziridine, B.P. 110–112°/0.13 mm.

EXAMPLE 2

1 - [1-(3,4,5-trimethoxyphenyl)-2-propyl]aziridine was prepared from 6 g. of 1-(3,4,5-trimethoxyphenyl)-1-propene and 0.13 g. of sodium metal in 3 ml. of ethylenimine using the procedure described in Example 1. There was thus obtained 2.1 g. of 1-[1-(3,4,5-trimethoxyphenyl)-2-propyl]aziridine, B.P. 100–101°/0.04 mm.

EXAMPLE 3

1 - [1 - (2 - methoxy - 4,5 - methylenedioxyphenyl) - 2-propyl]aziridine was prepared from 7 g. of 1-(2-methoxy-4,5-methylenedioxyphenyl)-1-propene, 0.9 g. of atomized sodium in 9 ml. of ethylenimine using the procedure described in Example 1. The 1-[1-(2-methoxy-4,5-methylenedioxyphenyl)-2-propyl]aziridine thus obtained had the B.P. 101°/0.3 mm.

INTERMEDIATES

1-(3,4,5-trimethoxyphenyl)ethanol

A solution of 25 g. of 3,4,5-trimethoxybenzaldehyde in 720 ml. of ether was added to a refluxing solution of methyl-magnesium bromide made from 6.22 g. of magnesium turnings and 25.26 g. of methyl bromide in 400 ml. of ether. The mixture was refluxed for twelve hours then hydrolyzed with 300 ml. of 10% ammonium chloride. The ether layer was separated, the aqueous layer extracted with ether and the combined extracts washed with water and dried. The ether was removed by evaporation and the residue fractionally distilled to give 21 g. of 1-(3,4,5-trimethoxyphenyl)ethanol, B.P. 133–134°/0.1 mm.

3,4,5-trimethoxystyrene

The 1-(3,4,5-trimethoxyphenyl)ethanol prepared as above (14.6 g.) was added dropwise to 2.5 g. of freshly fused potassium hydrogen sulfate, containing a small crystal of p-t-butyl-catechol, at 220–230°, while the pressure was kept at 18 mm. After the addition was complete the temperature and pressure were held constant for ten minutes, then the pressure was slowly lowered and the product distilled at 0.2 mm. The distillate was dissolved in 50 ml. of ether, the ether solution washed with water and dried, and a small amount of p-t-butylcatechol added. After the ether was removed by distillation the residue was fractionated to give 5.8 g. of 3,4,5-trimethoxystyrene, B.P. 99–101°/0.5 mm.

It is obvious that other modifications may be made of my invention, and I desire that my invention be limited only by the scope of the appended claims.

I claim:
1. A compound of the formula

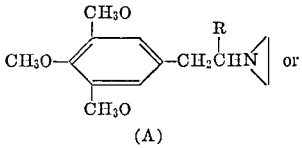

(A)

or

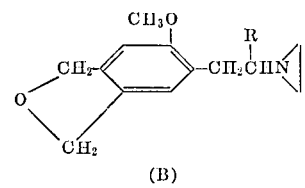

(B)

wherein R is hydrogen or methyl.

2. A compound according to claim 1 of Formula A wherein R is hydrogen.

3. A compound according to claim 1 of Formula A wherein R is methyl.

4. A compound according to claim 1 of Formula B wherein R is methyl.

References Cited

UNITED STATES PATENTS 2,654,737   10/1953   Bestian _____ 260—239

ALTON D. ROLLINS, Primary Examiner

U.S. Cl. X.R.

102—24, 39; 260—340.5, 613 D; 424—244, 282